(12) United States Patent
Nassar et al.

(10) Patent No.: US 11,682,401 B2
(45) Date of Patent: *Jun. 20, 2023

(54) MATCHING SPEAKERS TO MEETING AUDIO

(71) Applicant: Cisco Technology, Inc., San Jose, CA (US)

(72) Inventors: Kareem Aladdin Nassar, Fremont, CA (US); David Abraham Wiener, Redwood City, CA (US)

(73) Assignee: Cisco Technology, Inc, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,844

(22) Filed: Mar. 18, 2021

(65) Prior Publication Data
US 2021/0280198 A1    Sep. 9, 2021

Related U.S. Application Data

(63) Continuation of application No. 16/410,797, filed on May 13, 2019, now Pat. No. 10,964,330.

(51) Int. Cl.
*G10L 17/06*    (2013.01)
*G10L 25/78*    (2013.01)

(52) U.S. Cl.
CPC .............. *G10L 17/06* (2013.01); *G10L 25/78* (2013.01)

(58) Field of Classification Search
None
See application file for complete search history.

(56) References Cited

U.S. PATENT DOCUMENTS 5,526,407 A * 6/1996 Russell ............... G06F 3/16
                                                    715/201
2020/0234517 A1* 7/2020 Campanella ........... G06N 3/08

OTHER PUBLICATIONS

David Goodwin, "NVIDIA TensorRT Inference Server Boosts Deep Learning Inference", Sep. 12, 2018, 1. https://devblogs.nvidia.com/nvidia-serves-deep-learning-inference/, 20 pages.
Hajibabaei et al., "Unified Hypersphere Embedding for Speaker Recognition", Jul. 22, 2018, 2. https://arxiv.org/pdf/1807.08312.pdf, 7 pages.
Vinyals et al., "Matching Networks for One Shot Learning," Dec. 29, 2017, https://arxiv.org/pdf/1606.04080, 12 pages.pdf.
Ravanelli et al., "Speaker Recognition From Raw Waveform With Sincnet," Aug. 9, 2019, https://arxiv.org/pdf/1808.00158, 8 pages.pdf.

(Continued)

*Primary Examiner* — Quynh H Nguyen
(74) *Attorney, Agent, or Firm* — Merchant & Gould P.C.

(57) ABSTRACT

One embodiment of the present invention sets forth a technique for processing recordings of events. The technique includes applying a machine learning model to a plurality of samples from one or more recordings of the events to generate a plurality of embeddings representing the plurality of samples. The technique also includes generating a plurality of labels that identify speakers associated with the plurality of samples based on metadata comprising timestamps of voice activity during the events and participants associated with the voice activity. The technique further includes storing mappings of the plurality of embeddings to the plurality of labels.

20 Claims, 4 Drawing Sheets

(56) References Cited

OTHER PUBLICATIONS

HTTP/2, https://en.wikipedia.org/wiki/HTTP/2, 12 pages, Mar. 18, 2021.
JRPC, A High-Performance, Open Dource Universal RPC Framework, https://grpc.io/, 4 pages, Mar. 18, 2021.
Cloud Spanner, Google Cloud named a Leader in the 2019 Gartner Magic Quadrant for Operational Database Management Systems https://cloud.google.com/spanner/, 10 pages.
Snyder et al., "X-Vectors: Robust DNN Embeddings for Speaker Recognition," Center for Language and Speech Processing & Human Language Technology Center of Excellence The Johns Hopkins University, Baltimore, MD 21218, USA, 8. https://www.danielpovey.com/files/2018_icassp_xvectors.pdf,5 pages.

* cited by examiner

MATCHING SPEAKERS TO MEETING AUDIO

RELATED APPLICATION

The present application is a continuation of and claims priority to U.S. patent application Ser. No. 16/410,797 filed on May 13, 2019, which issued as U.S. Pat. No. 10,964,330, on Mar. 30, 2021, the disclosure of which is hereby incorporated herein in its entirety by reference.

BACKGROUND

Field of the Various Embodiments

Embodiments of the present invention relate generally to text and speech analytics, and more particularly, to matching speakers to meeting audio.

DESCRIPTION OF THE RELATED ART

Recent technological advances have allowed meetings to be conducted more efficiently and effectively. For example, network-enabled devices have been deployed with solutions that allow people to conduct teleconferences with one another instead of requiring all participants to be in the same physical location. The solutions may also allow the participants to record video and/or audio during meetings, generate transcripts from meeting recordings, share notes and minutes with one another, find meeting times that work best for most or all participants, and/or interact or collaborate within a virtual or augmented environment.

However, automatic speech recognition (ASR) engines that generate transcripts from meetings or other recordings are unable to detect or recognize individual speakers in the meetings. As a result, users reviewing the transcripts may lack the ability to match the transcripts and/or portions of the recordings to the corresponding speakers, search or filter the transcripts and/or recordings by speaker, and/or derive insights or conclusions from the actions and/or speech of the speakers.

As the foregoing illustrates, what is needed is a technological improvement for enhancing meeting solutions with speaker recognition functionality.

SUMMARY

One embodiment of the present invention sets forth a technique for processing recordings of events. The technique includes applying a machine learning model to a plurality of samples from one or more recordings of the events to generate a plurality of embeddings representing the plurality of samples. The technique also includes generating a plurality of labels that identify speakers associated with the plurality of samples based on metadata comprising timestamps of voice activity during the events and participants associated with the voice activity. The technique further includes storing mappings of the plurality of embeddings to the plurality of labels.

At least one advantage of the disclosed techniques includes the labeling of audio with the corresponding speakers without manual user review and/or input. Consequently, the disclosed techniques provide technological improvements in the interactivity, functionality, and performance of interactive virtual assistants and/or the training, execution, and performance of machine learning models or techniques for performing speaker recognition.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
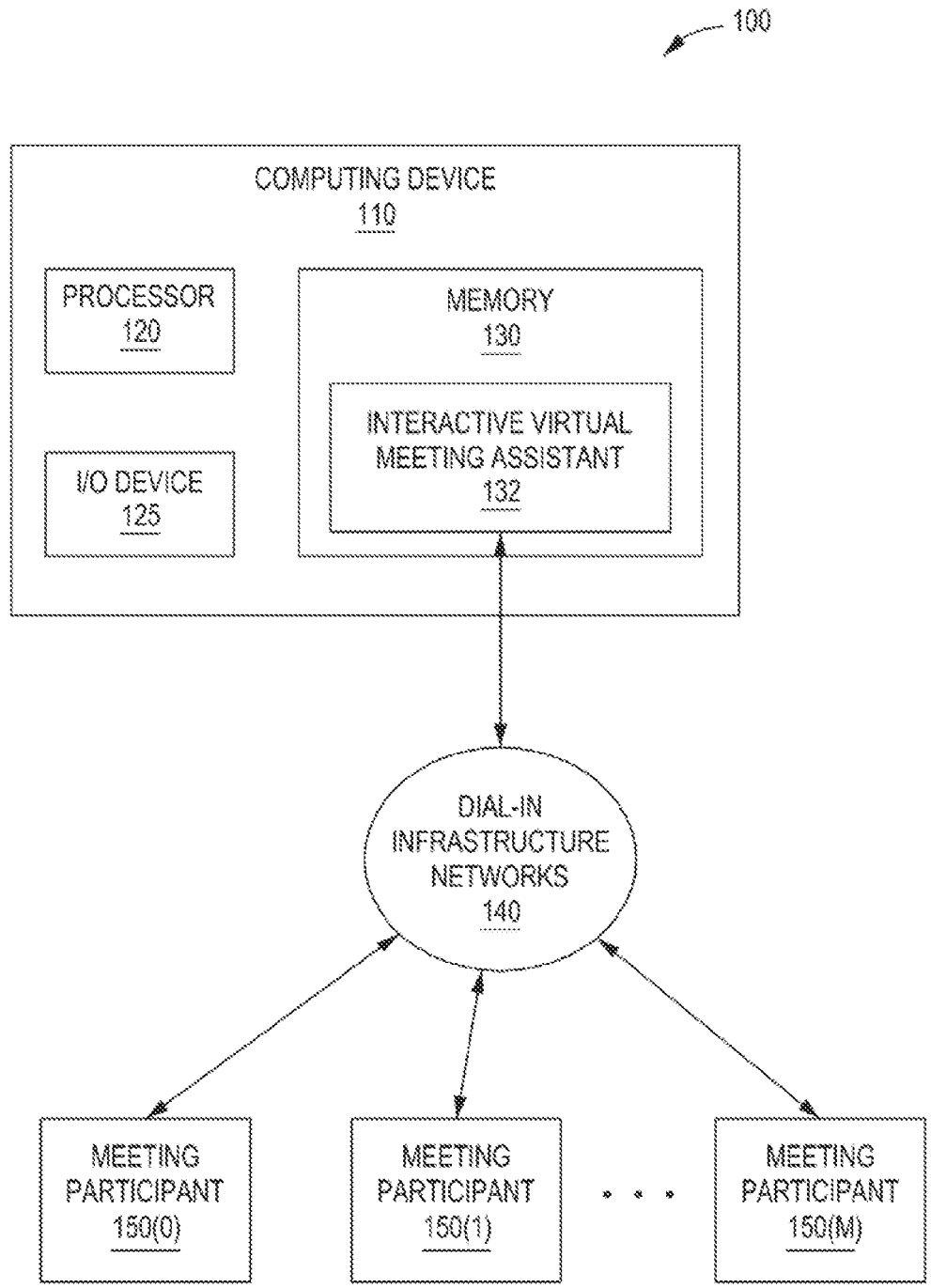
FIG. 1 is a block diagram illustrating a system configured to implement one or more aspects of the present disclosure.

FIG. 1 illustrates a system 100 configured to implement one or more aspects of the present disclosure. As shown, system 100 includes, without limitation, a computing device 110 coupled via dial-in infrastructure networks 140 to multiple meeting participants 150(0) to 150(m).

As shown, computing device 110 includes, without limitation, a processor 120, input/output (I/O) devices 125, and a memory 130. Processor 120 may be any technically feasible form of processing device configured to process data and execute program code. Processor 120 could be, for example, a central processing unit (CPU), a graphics processing unit (GPU), an application-specific integrated circuit (ASIC), a field-programmable gate array (FPGA), and so forth. I/O devices 125 may include devices configured to receive input or provide output, including, for example, a keyboard, a mouse, a display, and so forth.

Memory 130 includes any technically feasible storage medium configured to store data and software applications. Memory 130 may be, for example, a hard disk, a random-access memory (RAM) module, a read-only memory (ROM), and so forth. As also shown, memory 130 includes, without limitation, an interactive virtual meeting assistant 132, which is a software application that, when executed by processor 120, causes processor 120 to execute an interactive virtual meeting assistant application. Interactive virtual meeting assistant 132 may include any technically feasible type of virtual meeting assistant, such as the EVA application from VOICEA, INC.

Dial-in infrastructure networks 140 include any technically feasible network or set of interconnected communication links that enable interactive virtual meeting assistant 132, as executed by processor 120, to participate in a meeting with one or more meeting participants 150(0) to 150(m). In various embodiments, dial-in infrastructure networks 140 include, without limitation, one or more telephone line connections or one or more computer connections, such as a local area network (LAN), wide area network (WAN), the World Wide Web, or the Internet, among others. Dial-in infrastructure networks 140 may also allow interactive virtual meeting assistant 132 to access other information via the networks, such as by accessing information via the World Wide Web, or the Internet, among others.

Meeting participants 150(0) to 150(m) represent one or more human and/or computer participants in a meeting environment. Each of meeting participants 150(0) to 150(m) may be connected to other meeting participants and interactive virtual meeting assistant 132, as executed by processor 120, via any technically feasible device that forms a connection to other meeting participants, such as a telephone, smartphone, computing device, or personal data assistant, among others. The connections linking meeting participants 150(0) to 150(m) may be any technically feasible communication link(s), including, without limitation, communication links in dial-in infrastructure networks 140 and/or external communication links such as telephone line connections and/or network connections to a local area network (LAN), wide area network (WAN), the World Wide Web, or the Internet, among others.

Although FIG. 1 shows interactive virtual meeting assistant 132 stored in memory 130 of computing device 110, in alternative embodiments, interactive virtual meeting assistant 132 may be stored in part or entirely in memory 130 and/or on any technically feasible memory device internal to or external to computing device 110, including any memory device coupled to computing device 110 through a wired connection, a wireless connection, a network connection, and so forth.

Interactive virtual meeting assistant 132 includes functionality to generate, track, and/or store metadata and recordings related to a meeting. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. Interactive virtual meeting assistant 132 may also, or instead, capture audio and/or video of the meeting; record notes or action items generated during the meeting; and/or generate a transcript from the audio and/or video recording of the meeting. Interactive virtual meeting assistant 132 may further record "highlights" that are flagged by one or more meeting participants 150(0) to 150(m) as important. A meeting participant may activate recording of a highlight by issuing a voice command and/or other type of input to interactive virtual meeting assistant 132.

Interactive virtual meeting assistant 132 also includes functionality to join a meeting hosted by a teleconferencing system as a full participant. The teleconferencing system may provide features and/or services that include, but are not limited to, audio, video, chat, screen sharing, file sharing, virtual reality, webcasts, and/or webinars. For example, interactive virtual meeting assistant 132 may obtain a title, location (e.g., physical address, building number, conference room name, teleconferencing link, phone number, etc.), description, agenda, time, duration, list of participants, inviter or organizer, and/or other information describing the meeting from a calendar invitation, email, text message, chat message, voicemail, phone call, and/or other communication related to the meeting. At the start of the meeting, interactive virtual meeting assistant 132 may load a Uniform Resource Locator (URL) for the meeting in a headless browser and "sign in" to the meeting as a participant. Interactive virtual meeting assistant 132 may also install virtual input/output (I/O) devices for integrating interactive virtual meeting assistant 132 into the meeting and use the virtual I/O devices generate a visual, audio, and/or text-based representation of interactive virtual meeting assistant 132 in the meeting.

During the meeting, interactive virtual meeting assistant 132 uses the virtual I/O devices to implement "enhanced" meeting participation functionality by interactive virtual meeting assistant 132. For example, interactive virtual meeting assistant 132 may use a virtual display and/or virtual speaker to receive a video and/or audio feed of the meeting and analyze the feed to detect verbal, text-based, and/or gesture-based commands issued by human participants to interactive virtual meeting assistant 132. Interactive virtual meeting assistant 132 may also generate visual, sound-based, and/or text-based responses to the commands that are outputted over a virtual webcam, virtual microphone, and/or virtual keyboard.

Continuing with the above example, Interactive virtual meeting assistant 132 may apply a speech recognition technique, face detection technique, and/or optical character recognition (OCR) technique to the video and/or audio feed to generate a transcript of the meeting, identify portions of the meeting in which individual participants are speaking (e.g., based on changes in speaker names displayed in the video feed and/or data received via the virtual I/O devices), and/or capture text displayed in the participants' screens (e.g., during screen sharing by the participants) and/or the chat module of the teleconferencing system. Interactive virtual meeting assistant 132 may also annotate the transcript, translation, and/or recordings of the video and/or audio feed with the corresponding speakers, arrival and departure times of participants, emotions, topics, themes, and/or other additional insights related to meeting. Finally, interactive virtual meeting assistant 132 may store the transcript, translation, metadata, and/or recordings for subsequent review and/or analysis by the participants and/or other users with an interest in the meeting. In turn, the insights and/or annotations can be used to characterize the voices of the speakers, train a machine learning model to generate output that distinguishes among the voices of the speakers, and/or label additional portions of recordings with the corresponding speakers.

Matching Speakers to Meeting Audio

Figure 2:
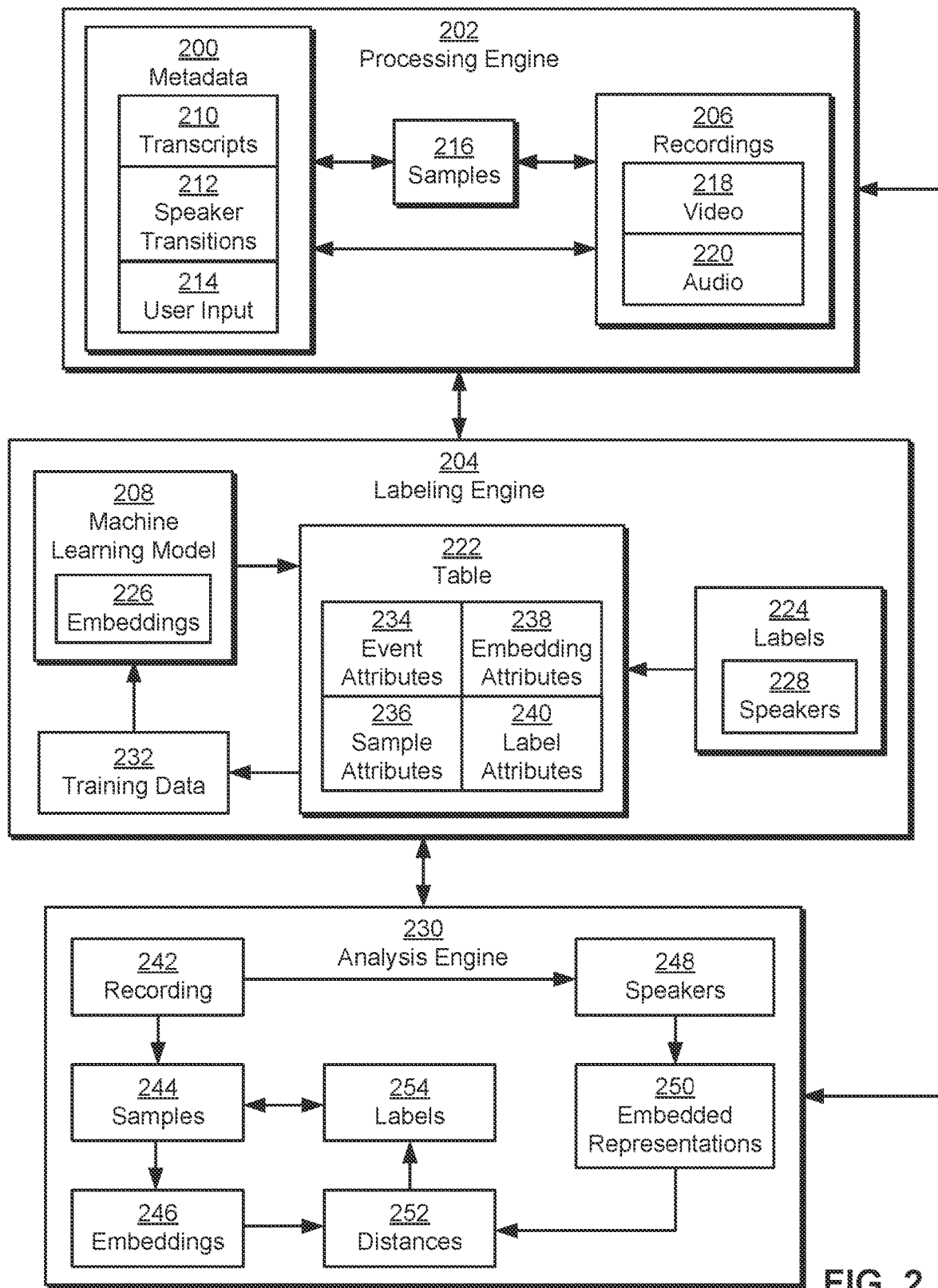
FIG. 2 is a more detailed illustration of functionality provided by the interactive virtual meeting assistant of FIG. 1, according to one or more aspects of various embodiments.

FIG. 2 is a more detailed illustration of functionality provided by interactive virtual meeting assistant 132 of FIG. 1, according to various embodiments of the present invention. As shown, the functionality is provided by a processing engine 202, a labeling engine 204, and an analysis engine 232, which can be implemented as part of and/or separately from interactive virtual meeting assistant 132. Each of these components is described in further detail below.

Processing engine 202 generates samples 216 of audio 218 and/or video 220 from recordings 206 of meetings and/or other types of activities or events. As mentioned above, recordings 206 of audio 218 and/or video 220 may be obtained by interactive virtual meeting assistant 132 using a virtual display, virtual speaker, and/or other virtual I/O devices. Recordings 206 may also, or instead, be obtained from and/or provided by other sources (e.g., from audio and/or video recording devices of participants in the events) and processed by processing engine 202 to produce samples 216.

In some embodiments, samples 216 are generated to span individual utterances (e.g., continuous units of speech bounded by clear pauses) in recordings 206. For example, processing engine 202 generates each sample to include a fixed-length and/or variable-length segment of speech produced by and/or received from a single source (e.g., a human participant, interactive virtual meeting assistant 132, etc.). To generate samples 216, processing engine 202 uses a voice activity detection technique to identify samples 216 as time intervals in recordings 206 of audio 220 that contain voice activity. The voice activity detection technique may identify and/or filter noise in the recording and classify fixed-duration frames (e.g., one-second frames) of the remaining audio signal as containing or not containing speech. Samples 216 may then be defined and/or represented as consecutive frames in the corresponding recordings 206 that are classified as containing speech.

Processing engine 202 and/or another component may also, or instead, divide intervals of voice activity in the recording into smaller samples 216. For example, the component may divide a five- to seven-second interval of voice activity into samples 216 containing individual phonemes, syllables, words, phrases, sentences, and/or other units of speech.

In one or more embodiments, processing engine 202 improves and/or modifies samples 216 based on metadata 200 associated with recordings 206. As shown, metadata 200 includes, but is not limited to, transcripts 210, speaker transitions 212, and/or user input 214.

Transcripts 210 are generated by one or more automatic speech recognition (ASR) engines provided by and/or associated with interactive virtual meeting assistant 132. For example, transcripts 210 include words, phrases, morphemes, n-grams, syllables, phonemes, and/or other representations of speech or text that is extracted from recordings 206. In some embodiments, transcripts 210 also include timestamps that indicate the times at which the corresponding portions of speech occurred.

Processing engine 202 analyzes timestamps in transcripts 210 to identify the times at which utterances occur in recordings 206. Processing engine 204 then matches the utterances to timestamps of the corresponding samples 216. When the timing of a sample fails to match the timing of a corresponding utterance in transcripts 210, processing engine 202 adjusts the time range of the sample, discards the sample, flags the sample for human review, and/or performs another action to address the mismatch.

Speaker transitions 212 identify times and/or periods during which individual speakers are detected in recordings 206 and/or the corresponding events. For example, each speaker transition includes a timestamp and an identifier for a new speaker detected at that timestamp. In some embodiments, speaker transitions 212 are obtained as speaker labels or names that are displayed in video 218 outputted by a teleconferencing system. For example, processing engine 202 and/or another component apply an OCR technique to video 218 to detect speaker transitions 212 as "display names" of speakers that are shown in video 218 to reflect the receipt of audio 220 and/or speech from different devices and/or sources. In another example, the component identifies speaker transitions 212 based on data received over a headless browser used by interactive virtual meeting assistant 132 to interface with the teleconferencing system.

Processing engine 202 uses speaker transitions 212 to validate the existence of utterances in samples 216. For example, processing engine 202 matches timestamps in speaker transitions 212 to the beginnings and/or ends of samples 216. When a sample fails to match a corresponding speaker transition, processing engine 202 adjusts the time range of the sample, discards the sample, flags the sample for human review, and/or performs another action to address the mismatch.

User input 214 includes user validations, additions, deletions, and/or modifications of samples 216. For example, processing engine 202 selects a random subset of samples 216 and/or a subset of samples 216 that are flagged as inconsistent with transcripts 210, speaker transitions 212, and/or other metadata 200. Processing engine 202 and/or another component output the selected samples 216 and/or recordings 206 to one or more users (e.g., through a user interface and/or a crowdsourcing platform). In response to the output, the users specify and/or verify attributes such as (but not limited to) a single speaker in a sample, a common speaker in two or more samples 216, the identity of a speaker in one or more samples 216, a new sample containing a single utterance, deletion of a sample that lacks a single utterance, and/or a change to the time interval in a recording that is spanned by a sample.

Processing engine 202 optionally uses video 218 of recordings 206 to further validate samples 216 generated from the corresponding audio 220. For example, processing engine 202 uses a face-tracking technique to identify portions of video 218 that contain faces of speakers and matches the portions to corresponding samples 216 of audio 220. Processing engine 202 then verifies that mouth motion in the portions of video 218 is synchronized with speech in the corresponding samples 216 of audio 220.

Labeling engine 204 generates a table 222 that stores data related to samples 216, embeddings 226 of samples 216, and/or speakers 228 associated with samples 216. As shown, labeling engine 204 generates labels 224 that identify speakers 228 of words, phrases, sentences, and/or other utterances in samples 216.

In one or more embodiments, labels 224 include unique identifiers for speakers 228 in a corresponding meeting or event. For example, labeling engine 204 extracts values of labels 224 for speakers 228 in a meeting from a calendar invitation, email, text message, chat message, voicemail, phone call, and/or another communication or content related to scheduling or creating the meeting. The values include, but are not limited to, full names, email addresses, usernames, and/or numeric identifiers for the corresponding meeting participants.

In one or more embodiments, labeling engine 204 uses metadata 200 to assign labels 224 to the corresponding samples 216. For example, labeling engine 204 obtains and/or identifies speaker transitions 212 associated with samples 216 produced by processing engine 202. For each sample with a corresponding speaker transition, labeling engine 204 obtains a "display name" from metadata 200 for the speaker transition as a username, first name, last name, device name, conference room name, and/or another representation of a source of audio 220 and/or video 218 identified by a teleconferencing system used to conduct the corresponding meeting.

Continuing with the above example, labeling engine 204 and/or another component match the display name to an email address, username, and/or other unique identifier for a participant in the meeting. The matching may be performed deterministically when the unique identifier is emitted by the teleconferencing system during the meeting; the participant voluntarily provides his/her email address to interactive virtual meeting assistant 132 before, during, or after the meeting; and/or the identity of the participant is specified or verified in user input 214. When a deterministic match cannot be generated, a given display name may be probabilistically matched to a corresponding email address, username, full name, and/or other identifier for a speaker based on similarity and/or overlap between the display name and identifier (e.g., matching a display name of "John Smith" to a name of "John M. Smith" and/or an email address of "jsmith@email.com" from a calendar invitation for the same meeting).

Labeling engine 204 uses a machine learning model 208 to generate embeddings 226 of samples 216. For example, machine learning model 208 includes a deep learning model, convolutional neural network (CNN), and/or another type of machine learning model 208. Input to machine learning model 208 includes, but is not limited to, a spectrogram, one or more mel frequency ceptral coefficients (MFCCs), a raw waveform, and/or other another representation of a sample of audio 220 and/or video 218. The corresponding output of machine learning model 208 includes an embedding that is a fixed-length vector representation of the sample.

In one or more embodiments, machine learning model 208 is trained using samples 216 of recordings 206 and the corresponding labels 224. For example, labeling engine 204 generates training data 232 for machine learning model 208 by selecting, from samples 216, an anchor sample with a given label, a positive sample with the same label as the anchor sample, and a negative sample with a different label from the anchor sample. Labeling engine 204 inputs the anchor, positive, and negative samples into machine learning model 208 to generate three corresponding embeddings 226. Labeling engine 204 then uses a training technique and/or one or more hyperparameters to update parameter values (e.g., neural network weights) of machine learning model 208 so that a first distance (e.g., Euclidean distance, cosine similarity, cross product, etc.) between the embeddings of the anchor sample and the positive sample is smaller than a second distance between the embeddings of the anchor sample and the negative sample. Labeling engine 204 repeats the process with additional sets of anchor, positive, and negative samples 216; epochs; batches; and/or training iterations until convergence and/or a certain level of performance is reached.

In some embodiments, machine learning model 208 is created and/or trained using external data sets containing additional samples of speaker voices. For example, machine learning model 208 may initially be trained using one or more publicly available data sets of labeled voices. Machine learning model 208 may then be updated using additional samples 216 and labels 224 from recordings 206 to improve the generation of embeddings 226 for voices, environments, and/or use cases associated with recordings 206.

Labeling engine 204 populates table 222 with entries representing individual samples 216 in recordings 206. Each entry includes one or more event attributes 234, sample attributes 236, embedding attributes 238, and/or label attributes 240. Event attributes 234 for a sample include attributes that identify and/or characterize an event from which the sample was extracted. For example, event attributes 234 for a meeting include, but are not limited to, a unique ID for the meeting, an email address of the meeting's inviter, and/or a meeting name for the meeting.

Sample attributes 236 identify and/or characterize the sample represented by a given entry in table 222. For example, sample attributes 236 include, but are not limited to, a path to the sample, a file containing the sample, timestamps representing the start and end of the sample in a recording, a confidence score representing the likelihood that the sample contains a single utterance and/or is correctly labeled, and/or metadata related to generating the confidence score (e.g., values of user input 214 related to the sample, deterministic or probabilistic matching of the label to the display name, etc.).

Embedding attributes 238 identify and/or characterize the embedding produced by machine learning model 208 from the sample. For example, embedding attributes 238 include, but are not limited to, the value of the embedding (e.g., a 512-dimension vector of floating point values), the version of machine learning model 208 used to produce the embedding, a timestamp representing the time at which the embedding was computed, and/or an optional field specifying the version of machine learning model 208 trained using the embedding (e.g., to avoid use of different versions of the embedding when determining a label for a new sample using analysis engine 230).

Label attributes 240 identify and/or characterize the label for the sample. For example, label attributes 240 include, but are not limited to, a display name for the speaker (e.g., from a teleconferencing system over which video 218 and/or audio 220 of the sample is obtained), the corresponding label (e.g., username, full name, email address, user ID, etc.), the time at which the label was generated, the type of label (e.g., probabilistic or deterministic), and/or a confidence score representing the likelihood that the label is correct (e.g., 1.0 for a deterministic match between the display name and label and a value less than 1 for a probabilistic match between the display name and label).

As additional samples 216 are generated from additional recordings 206 with available metadata 200, labeling engine 204 assigns labels 224 to the samples, generates embeddings 226 from the samples, and updates table 222 with entries containing the corresponding event attributes 234, sample attributes 236, embedding attributes 238, and/or label attributes 240. Labeling engine 204 also, or instead, updates event attributes 234, sample attributes 236, embedding attributes 238, and/or label attributes 240 within individual entries in table 222 to reflect changes to machine learning model 208 and/or user input 214 for modifying labels 224 and/or the boundaries of the samples. Consequently, labeling engine 204 generates and/or updates table 222 as a "catalog" that contains samples 216 of the voices of speakers 228, embeddings 226 that represent fixed-length "fingerprints" of the voices, and/or labels 224 that identify speakers 228.

Analysis engine 230 uses data in table 222 to generate additional labels 254 of speakers 248 associated with samples 244 from a new and/or additional recording 242. For example, analysis engine 230 obtains recording 242 as a live audio and/or video stream and performs "online" annotation of fixed-length samples 244 of the stream and/or a corresponding transcript with labels 254 as the samples are received during the event. In another example, analysis engine 230 obtains recording 242 as a video and/or audio file after the event has ended, divides recording 242 into samples 244 containing utterances from individual speakers (e.g., using processing engine 202 and/or techniques employed by processing engine 202), and performs "offline" generation of labels 254 for samples 244.

In both the online and offline use cases, analysis engine 230 determines a list of potential speakers 248 as participants in the corresponding event. For example, analysis engine 230 obtains a list of names, usernames, email addresses, and/or other identifiers for speakers 248 from a calendar invitation for the event, an organizer of the event, and/or a user requesting the matching of speakers 248 to samples 244 in recording 242. In another example, analysis engine 230 includes all speakers 228 in table 222 as potential participants in the event when metadata for the event is unavailable (e.g., when recording 242 is provided without additional context).

Next, analysis engine 230 uses table 222 to generate embedded representations 250 of speakers 248. Each embedded representation includes an aggregation of embeddings 226 associated with a given speaker. For example, analysis engine 230 computes an embedded representation of a speaker's voice as the centroid of a subset of embeddings 226 mapped to a label for the speaker in table 222. In another example, analysis engine 230 uses a support vector machine and/or another classification technique to determine a vector space boundary around the subset of embeddings 226 associated with a given speaker.

After embedded representations 250 are produced, analysis engine 230 optionally stores embedded representations 250 in association with identifiers for the corresponding speakers 248 to allow reuse of embedded representations 250 in generating labels 254 for other recordings. Analysis engine 230 also, or instead, updates the stored embedded representations 250 in response to new data in table 222, new versions of machine learning model 208 and/or embeddings 226, and/or other events.

Analysis engine 230 also generates embeddings 246 from samples 244. For example, analysis engine 230 uses table 222 to identify the version of machine learning model 208 used to create embeddings 226 from which embedded representations 250 are produced. Analysis engine 230 uses the same version of machine learning model 208 to generate embeddings 246 from samples 244 of recording 242.

Analysis engine 230 calculates distances 252 between embeddings 246 and embedded representations 250 and selects labels 254 for samples 244 based on distances 252. For example, analysis engine 230 calculates distances 252 as cosine similarities, cross products, Euclidean distances, and/or other measures of vector similarity between each embedding in embeddings 246 and embedded representations 250 that are calculated as centroids of embeddings 226 associated with speakers 248. Analysis engine 230 then identifies an embedded representation with the shortest distance to an embedding in embeddings 246 and sets the label for the corresponding sample to the speaker associated with the embedded representation.

In another example, analysis engine 230 compares each embedding produced from samples 244 with embedded representations 250 that include vector space boundaries of embeddings 226 associated with different speakers 248 to identify a boundary within which each embedding lies. Analysis engine 230 identifies a speaker represented by the boundary and sets the label for the corresponding sample to the speaker.

Analysis engine 230 optionally validates labels 254 by shifting samples 244 by small windows. For example, analysis engine 230 shifts the start of a given sample forward and/or the end of the sample backward by 10-millisecond increments to generate multiple additional samples that substantially overlap with the sample. Analysis engine 230 produces additional embeddings 246 of the additional samples, determines distances 252 between the additional embeddings and embedded representations 250 of speakers 248, and assigns additional labels 254 to the additional embeddings based on distances 252. Analysis engine 230 verifies that the label assigned to the original sample is likely to be correct when the label is consistent with most or all of the additional labels 254. Conversely, analysis engine 230 detects a potentially incorrect label for the original sample when the label is not consistent with most or all of the additional labels 254.

After labels 254 are generated and/or validated, analysis engine 230 stores labels 254 in association with the corresponding samples 244 and/or embeddings 246. For example, analysis engine 230 updates table 222 and/or a separate data structure with mappings of labels 254 to the corresponding samples 244 and/or embeddings 246. When a label cannot be validated (e.g., when the label lacks consistency with additional labels 254 associated with small shifts in the beginning and/or end of the same sample), analysis engine 230 and/or another component requests labeling of the sample via user input 214.

In turn, interactive virtual meeting assistant 132 uses labels 254 to enhance participation in and/or subsequent analysis of meetings or other events. For example, interactive virtual meeting assistant 132 displays or outputs labels 254 in conjunction with the corresponding portions of the transcript and/or samples 244; filters samples 244, the transcript, and/or the corresponding insights by labels 254 and/or speakers 248; and/or processes voice commands according to the identities of the corresponding speakers (e.g., processing a command for adding a reminder to a speaker's calendar by identifying the speaker and creating the reminder in a calendar associated with the speaker's email address).

Figure 3:
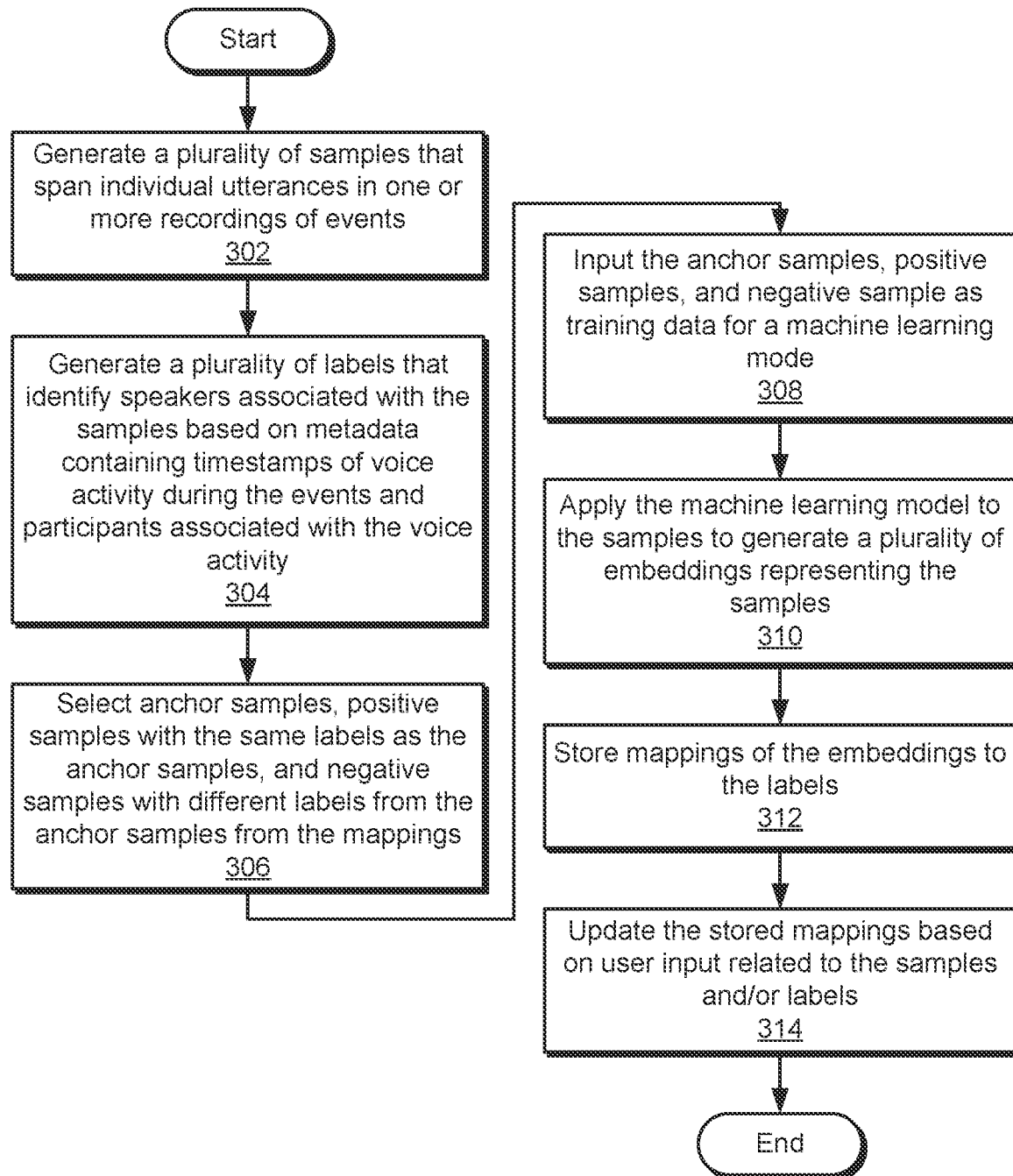
FIG. 3 is a flow diagram of method steps for processing recordings of events, according to one or more aspects of various embodiments.

FIG. 3 is a flow diagram of method steps for processing recordings of events, according to one or more aspects of various embodiments. Although the method steps are described in conjunction with the systems of FIGS. 1-2, persons skilled in the art will understand that any system configured to perform the method steps, in any order, is within the scope of the present invention.

As shown, processing engine 202 generates 302 a plurality of samples that span individual utterances in one or more recordings of events. For example, processing engine 202 may use a voice activity detection technique to produce samples of audio recordings that contain segments of speech. The voice activity detection technique may optionally filter and/or remove intervals of noise from the samples. In another example, processing engine 202 improves and/or updates the samples by matching the beginnings and/or ends of the samples to timestamps in transcriptions of the recording(s), changes in speakers detected by and/or extracted from teleconferencing systems over which the events are held, and/or user input.

Next, labeling engine 204 generates 304 a plurality of labels that identify speakers associated with the samples based on metadata containing timestamps of voice activity during the events and participants associated with the voice activity. For example, the metadata includes the speaker changes detected by the teleconferencing systems. Each speaker change includes a display name for a corresponding speaker, which is matched to an email address, full name, username, and/or other unique identifier for the speaker. The matching can be performed deterministically when the unique identifier is emitted by the teleconferencing system during the meeting, the speaker voluntarily provides his/her email address, and/or the identity of the speaker is verified by the speaker or another user. When a deterministic match cannot be generated, the display name is probabilistically matched to the unique identifier for the speaker based on similarity and/or overlap between the display name and identifier.

Labeling engine 204 selects 306 anchor samples, positive samples with the same labels as the anchor samples, and negative samples with different labels from the anchor samples from the mappings. Labeling engine 204 also inputs 308 the anchor samples, positive samples, and negative samples as training data for a machine learning model.

For example, labeling engine 204 selects each positive sample to have the same speaker as the corresponding anchor sample and each negative sample to have a different speaker than the corresponding anchor sample. Labeling engine 204 uses the machine learning model to generate embeddings from spectrograms and/or other representations of the anchor, positive, and negative samples and calculates a first distance between the embeddings of the anchor sample and positive sample and a second distance between the embeddings of the anchor sample and the negative sample. Labeling engine 204 then updates parameters of the machine learning model until the first distance is shorter than the second distance.

Labeling engine 204 applies 310 the machine learning model to the samples to generate a plurality of embeddings representing the samples. Finally, labeling engine 204 stores 312 mappings of the embeddings to the labels and updates 314 the stored mappings based on user input related to the samples and/or labels. For example, labeling engine 204 stores an embedding of a sample and a label for the embedding with one or more attributes of the corresponding event event, the recording of the event, the embedding, and/or the label. When the label is associated with low confidence, labeling engine 204 requests verification of the label and/or attributes from one or more users. In turn, feedback from the users may be used to filter the stored mappings, update confidence scores in the stored mappings, and/or change a subset of labels in the stored mappings.

Figure 4:
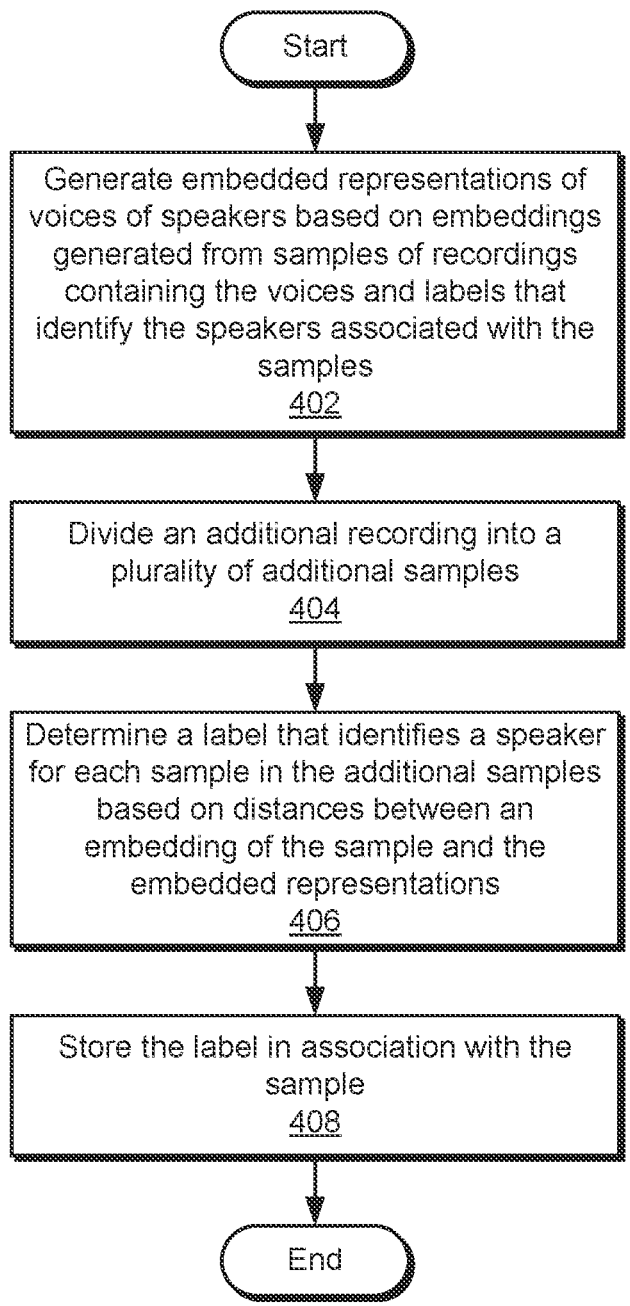
FIG. 4 is a flow diagram of method steps for identifying speakers associated with samples of a recording, according to one or more aspects of various embodiments.

FIG. 4 is a flow diagram of method steps for identifying speakers associated with samples of a recording, according to one or more aspects of various embodiments. Although the method steps are described in conjunction with the systems of FIGS. 1-2, persons skilled in the art will understand that any system configured to perform the method steps, in any order, is within the scope of the present invention.

As shown, analysis engine 230 generates 402 embedded representations of voices of the speakers based on embeddings generated from samples of recordings containing the voices and labels that identify the speakers associated with the samples. For example, analysis engine 230 calculates each embedded representation as a centroid of all embeddings associated with a speaker. In another example, analysis engine 230 uses a support vector machine and/or another classification technique to determine a vector space boundary around embeddings associated with a speaker.

Next, analysis engine 230 divides 404 an additional recording into a plurality of additional samples. For example, analysis engine 230 generates the additional samples by applying a voice activity detection technique to the additional recording, matching the additional samples to a transcription of the additional recording, and/or updating the boundaries of one or more additional samples based on user input.

Analysis engine 230 then determines 406 a label that identifies a speaker for each sample in the additional samples based on distances between an embedding of the sample and the embedded representations. For example, analysis engine 230 calculates the distance as a cosine similarity, cross product, Euclidean distance, and/or another measure of vector similarity between the embedding and the embedded representations. Analysis engine 230 then the sets the label to the speaker associated with an embedded representation that has the shortest distance to the embedding. In another example, analysis engine 230 identifies a vector space boundary within which the embedding lies and assigns the label to the corresponding speaker.

Finally, analysis engine 230 stores 408 the label in association with the sample. For example, analysis engine 230 stores a mapping of the label to an identifier, path, transcription, and/or file for the sample. The stored mapping may then be displayed to one or more users, used to filter samples and/or transcriptions of the additional recording, and/or perform other operations related to the samples and/or speakers.

In sum, the disclosed techniques match speakers to samples of audio containing the speakers' voices. Speaker changes, transcriptions of the audio, user input, and/or other metadata associated with the audio are used to divide the audio into the samples and assign labels that identify speakers associated with the samples. The samples and labels are used as training data for a machine learning model that outputs embeddings of the samples, so that embeddings of samples from the same speaker are closer together in a vector space than embeddings of samples from different speakers. The embeddings, samples, and/or labels are then stored in one or more mappings and/or data structures and subsequently used to identify speakers in additional samples and/or recordings.

By using metadata collected by and/or over teleconferencing systems and interactive virtual meeting assistants to identify speakers in meetings and/or other events, the disclosed techniques allow audio of the events to be labeled with the corresponding speakers instead of requiring manual user review and/or input to generate all of the labels. In turn, training of a machine learning model that produces embeddings representing "voice fingerprints" for the speakers from the labeled audio allows the speakers to be matched to additional samples even in the absence of speaker transitions and/or other metadata for the additional samples. Consequently, the disclosed techniques provide technological improvements in the interactivity, functionality, and performance of interactive virtual assistants and/or the training, execution, and performance of machine learning models or techniques for performing speaker recognition.

1. In some embodiments, a method for processing recordings of events comprises applying a machine learning model to a plurality of samples from one or more recordings of the events to generate a plurality of embeddings representing the plurality of samples; generating a plurality of labels that identify speakers associated with the plurality of samples based on metadata comprising timestamps of voice activity during the events and participants associated with the voice activity; and storing mappings of the plurality of embeddings to the plurality of labels.

2. The method of clause 1, further comprising selecting an anchor sample, a positive sample with a same label as the anchor sample, and a negative sample with a different label from the anchor sample from the plurality of samples; and inputting the anchor sample, the positive sample, and the negative sample with the corresponding labels as training data for the machine learning model.

3. The method of clauses 1-2, further comprising aggregating the plurality of embeddings by the plurality of labels to produce embedded representations of voices of the speakers; and determining a label that identifies a speaker for a new sample based on distances between an embedding produced by the machine learning model from the new sample and the embedded representations.

4. The method of clauses 1-3, wherein aggregating the plurality of embeddings by the plurality of labels comprises at least one of computing a centroid of a subset of embeddings mapped to a label; and determining a boundary around the subset of embeddings.

5. The method of clauses 1-4, further comprising updating the stored mappings based on user input related to the plurality of samples and the plurality of labels.

6. The method of clauses 1-5, wherein the user input comprises at least one of a first verification of a single speaker in a sample, a second verification of a common speaker in two or more samples, and a change to a portion of a recording spanned by the sample.

7. The method of clauses 1-6, wherein updating the stored mappings comprises at least one of filtering the stored mappings based on the user input; updating confidence scores in the stored mappings based on the user input; and changing a subset of labels in the stored mappings based on the user input.

8. The method of clauses 1-7, further comprising generating the plurality of samples to span individual utterances in the one or more recordings.

9. The method of clauses 1-8, wherein generating the plurality of samples to span individual utterances in the recording comprises at least one of applying a voice activity detection technique to the one or more recordings to generate the plurality of samples; matching the plurality of samples to transcriptions of the one or more recordings; and setting a boundary of a sample based on a timestamp in the metadata.

10. The method of clauses 1-9, wherein generating the plurality of labels comprises generating the metadata based on speaker changes associated with one or more teleconferencing systems for conducting the events; and matching the metadata to identifiers for the speakers.

11. The method of clauses 1-10, wherein storing the mappings of the plurality of embeddings to the plurality of labels comprises storing an embedding and a label for the embedding with one or more attributes of an event, a recording of the event, the embedding, and the label.

12. The method of clauses 1-11, wherein applying the machine learning model to the plurality of samples comprises inputting a spectrogram of a sample into the machine learning model.

13. In some embodiments, a non-transitory computer readable medium stores instructions that, when executed by a processor, cause the processor to perform the steps of generating embedded representations of voices of speakers based on embeddings generated from samples of recordings containing the voices and labels that identify the speakers associated with the samples; dividing an additional recording into a plurality of additional samples; and for each sample in the plurality of additional samples, determining a label that identifies a speaker for the sample based on distances between an embedding of the sample and the embedded representations; and storing the label in association with the sample.

14. The non-transitory computer readable medium of clause 13, wherein the steps further comprise applying a machine learning model to the samples to generate the embeddings; generating the labels for the samples based on user input and metadata comprising timestamps of voice activity during the events and participants associated with the voice activity; and storing mappings of the embeddings to the labels.

15. The non-transitory computer readable medium of clauses 13-14, wherein the steps further comprise selecting an anchor sample, a positive sample with a same label as the anchor sample, and a negative sample with a different label from the anchor sample from the mappings; and inputting the anchor sample, the positive sample, and the negative sample as training data for the machine learning model.

16. The method of clauses 13-15, wherein generating the embedded representations of the voice of the speakers comprises at least one of computing an embedded representation of a voice of a speaker as a centroid of a subset of embeddings mapped to a label for the speaker; and determining a boundary around the subset of embeddings as the embedded representation.

17. The method of clauses 13-16, wherein determining the label that identifies the speaker for the sample comprises setting the label to a speaker associated with an embedded representation that has a shortest distance to the embedding.

18. The method of clauses 13-17, wherein determining the label that identifies the speaker for the sample further comprises validating the label based on at least one of metadata comprising speaker changes associated with timestamps in the additional recording, an additional label for an additional sample that overlaps with the sample, and user input.

19. The method of clauses 13-18, wherein dividing the additional recording into the plurality of additional samples comprises at least one of applying a voice activity detection technique to the additional recording; matching the plurality of additional samples to a transcription of the additional recording; and updating a boundary of a sample based on user input.

20. In some embodiments, a system comprises a memory that stores instructions, and a processor that is coupled to the memory and, when executing the instructions, is configured to apply a machine learning model to a plurality of samples from one or more recordings of the events to generate a plurality of embeddings representing the plurality of samples; generate a plurality of labels that identify speakers associated with the plurality of samples based on metadata comprising timestamps of voice activity during the events and participants associated with the voice activity; and store mappings of the plurality of embeddings to the plurality of labels.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for processing recordings of events, comprising:
    applying a machine learning model to one or more samples from a recording to generate one or more embeddings representing the one or more samples;
    generating one or more labels that identify speakers associated with the one or more samples based on metadata comprising activity output of a voice activity detection technique applied to the recording and identifiers for speakers associated with the recording;
    aggregating the one or more embeddings by the one or more labels to produce embedded representations of voices of the speakers, wherein the one or more embeddings are mapped to the one or more labels; and
    determining a label that identifies a speaker for a new sample based on distances between an embedding produced by the machine learning model from the new sample and the embedding representations.

2. The method of claim 1, further comprising:
    selecting an anchor sample, a positive sample with a same label as the anchor sample, and a negative sample with a different label from the anchor sample from the one or more samples; and
    training the machine learning model using the anchor sample, the positive sample, and the negative sample with the corresponding labels.

3. The method of claim 1, wherein aggregating the one or more embeddings by the one or more labels comprises:
    determining a boundary around a subset of embeddings mapped to a label.

4. The method of claim 1, wherein aggregating the one or more embeddings by the one or more labels comprises:
    computing a centroid of a subset of embeddings mapped to a label.

5. The method of claim 1, further comprising:
    receiving a user input related to at least one of the one or more samples, wherein the mapping for at least one of the one or more embeddings is updated based on the user input.

6. The method of claim 5, wherein the user input comprises a verification of an identifier for a single speaker in a sample.

7. The method of claim 5, wherein a confidence score associated with the at least one of the one or more embeddings is updated based on the user input.

8. The method of claim 1, further comprising:
    generating the one or more samples to span individual utterances in the recording.

9. The method of claim 8, wherein generating the one or more samples to span individual utterances in the recording comprises:
    matching the one or more samples to transcriptions of the recording.

10. The method of claim 1, wherein generating the one or more labels comprises:
    generating the metadata based on speaker changes.

11. The method of claim 1, wherein applying the machine learning model to the plurality of samples comprises inputting a spectrogram of a sample into the machine learning model.

12. The method of claim 5, wherein the user input comprises a verification of an identifier for a common speaker in two or more samples.

13. The method of claim 8, wherein generating the one or more samples to span individual utterances in the recording comprises:
setting a boundary of a sample based on a timestamp from the output of the voice activity detection technique.

14. The method of claim 1, wherein the recording is from a meeting hosted by a teleconferencing system.

15. A non-transitory computer readable medium storing instructions that, when executed by a processor, cause the processor to perform the steps of:
applying a machine learning model to one or more samples from a recording to generate one or more embeddings representing the one or more samples;
generating one or more labels that identify speakers associated with the one or more samples based on metadata comprising output of a voice activity detection technique applied to the recording and identifiers for speakers associated with the recording;
aggregating the one or more embeddings by the one or more labels to produce embedded representations of voices of the speakers, wherein the one or more embeddings are mapped to the one or more labels; and
determining a label that identifies a speaker for a new sample based on distances between an embedding produced by the machine learning model from the new sample and the embedding representations.

16. The non-transitory computer readable medium of claim 15, further comprising:
receiving a user input related to at least one of the one or more samples, wherein the mapping for at least one of the one or more embeddings is updated based on the user input; and
generating the one or more samples to span individual utterances in the recording.

17. The non-transitory computer readable medium of claim 15, further comprising:
generating the one or more samples to span individual utterances in the recording wherein generating the one or more samples to span individual utterances in the recording comprises:
matching the one or more samples to transcriptions of the recording, and
setting a boundary of a sample based on a timestamp from the output of the voice activity detection technique; and wherein generating the one or more labels comprises generating the metadata based on speaker changes.

18. A system comprising:
a memory that stores instructions, and
a processor that is coupled to the memory and, when executing the instructions, is configured to:
apply a machine learning model to one or more samples from a recording to generate one or more embeddings representing the one or more samples,
generate one or more labels that identify speakers associated with the one or more samples based on metadata comprising output of a voice activity detection technique applied to the recording and identifiers for speakers associated with the recording,
aggregate the one or more embeddings by the one or more labels to produce embedded representations of voices of the speakers, wherein the one or more embeddings are mapped to the one or more labels, and
determine a label that identifies a speaker for a new sample based on distances between an embedding produced by the machine learning model from the new sample and the embedding representations.

19. The system of claim 18, wherein the processor is further configured to:
receive a user input related to at least one of the one or more samples, wherein the mapping for at least one of the one or more embeddings is updated based on the user input; and
generate the one or more samples to span individual utterances in the recording.

20. The system of claim 18, wherein the processor is further configured to:
generate the one or more samples to span individual utterances in the recording wherein the processor being further configured to generate the one or more samples to span individual utterances in the recording comprises the processor being configured to:
match the one or more samples to transcriptions of the recording, and
set a boundary of a sample based on a timestamp from the output of the voice activity detection technique; and
wherein the processor being configured to generate the one or more labels comprises the processor being configured to generate the metadata based on speaker changes.

* * * * *